(12) United States Patent
Toda

(10) Patent No.: US 6,792,380 B2
(45) Date of Patent: Sep. 14, 2004

(54) ATTITUDE ANGLE DETECTING APPARATUS

(75) Inventor: Hiroyuki Toda, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 0 days.

(21) Appl. No.: 10/356,614

(22) Filed: Feb. 3, 2003

(65) Prior Publication Data

US 2003/0154049 A1 Aug. 14, 2003

(30) Foreign Application Priority Data

Feb. 12, 2002 (JP) ........................................ 2002-034377

(51) Int. Cl.[7] .............................................. G01C 17/00
(52) U.S. Cl. .................................. 702/151; 342/357.11
(58) Field of Search ................................. 702/151, 146; 342/357.11, 357.06; 701/214, 215; 340/937; 362/37; 356/602; 180/168

(56) References Cited

U.S. PATENT DOCUMENTS

| | | |
|---|---|---|
| 5,933,110 A | 8/1999 | Tang et al. |
| 6,061,631 A | 5/2000 | Zhang |
| 6,313,788 B1 * | 11/2001 | Wilson ................... 342/357.11 |
| 2003/0149528 A1 * | 8/2003 | Lin ............................. 701/214 |

FOREIGN PATENT DOCUMENTS

JP    2002-40124 A    2/2002

* cited by examiner

Primary Examiner—John Barlow
Assistant Examiner—Xiuqin Sun
(74) Attorney, Agent, or Firm—Birch, Stewart, Kolasch & Birch, LLP

(57) ABSTRACT

An attitude angle detecting apparatus receives radio waves transmitted from a plurality of position-fixing satellites with multiple antennas located at specific positions of a mobile unit, determines relative positions of the antennas and detects the heading and attitude of the mobile unit by determining carrier phase ambiguities quickly and accurately. When it is needed to redetermine integer ambiguities after recovery from an interruption of the radio waves from the position-fixing satellites or as a result of a change in combination of the position-fixing satellites, for example, the attitude angle detecting apparatus redetermines the integer ambiguities by using attitude angles and an attitude angle error covariance obtained from previous observation. This enables the attitude angle detecting apparatus to uninterruptedly obtain information on the heading and attitude of the mobile unit.

19 Claims, 7 Drawing Sheets

ATTITUDE ANGLE DETECTING APPARATUS

BACKGROUND OF THE INVENTION

1. Field of the Invention

This invention relates to an attitude angle detecting apparatus for detecting the heading and attitude of a mobile unit, such as an aircraft or a ship.

2. Description of the Prior Art

There exist conventionally used attitude angle detecting apparatus for detecting the heading and attitude of a mobile unit.

One type of such apparatus receives radio waves transmitted from a plurality of position-fixing satellites with multiple antennas located at specific positions of a mobile unit, one of the antennas being used as a reference antenna, measures phases of carrier signals of the radio waves, and determines relative positions of the antennas other than the reference antenna with respect to the reference antenna to determine the heading and attitude of a mobile unit.

Another type of such apparatus determines the attitude of a mobile unit by use of an angular velocity sensor like a rate gyro for measuring the turning rate of a mobile unit.

The aforementioned apparatus designed to determine the heading and attitude of a mobile unit from the radio waves transmitted from a plurality of position-fixing satellites makes use of important elementary technology for resolving carrier phase ambiguities.

If the radio waves from some of the position-fixing satellites are interrupted by some external obstacle, for example, it becomes impossible for the aforementioned apparatus to measure carrier phases and continue estimation of the heading and attitude (hereinafter referred to as attitude angles implying both) of the mobile unit. In such a situation, the apparatus estimates the attitude angles by using an attitude angle detecting device, such as the aforementioned angular velocity sensor. Although the apparatus resumes operation for determining carrier phase ambiguities based on the radio waves from the position-fixing satellites again when it becomes possible to receive the radio waves, it is not possible to instantly obtain the attitude angles, because it takes time to redetermine the carrier phase ambiguities.

If the length of a baseline is 3 m and the radio waves from the position-fixing satellites are interrupted for one minute, for example, it will take one to two minutes on average up to about 15 minutes at maximum to redetermine initial integer ambiguity values after the interruption.

One previous approach to the solution of this problem is to immediately determine the carrier phase ambiguities when it becomes possible to receive the radio waves again by using attitude angles estimated by an angular velocity sensor.

A conventional attitude angle detecting apparatus employing this previously known approach determines the carrier phase ambiguities upon restoring normal reception of the radio waves according to a procedure shown in a flowchart of FIG. 6.

Referring to FIG. 6, the apparatus calculates a baseline vector based on the attitude angles which have been uninterruptedly estimated by the angular velocity sensor while the radio waves have been interrupted. Next, the apparatus calculates floating ambiguities from the baseline vector and rounds off fractional parts of the floating ambiguities to obtain candidates (integer values) of a potentially true integer ambiguity. The candidates of the potentially true integer ambiguity so obtained are then examined and one candidate regarded as being correct is taken as the true integer ambiguity. According to this method, the aforementioned time needed for determining the integer ambiguity can be reduced to approximately 8 seconds on average, approximately 30 seconds at maximum.

The aforementioned conventional attitude angle detecting apparatus has a problem to be solved as described below.

The accuracy of estimated attitude angles achieved by the aforementioned conventional attitude angle detecting apparatus deteriorates when the radio waves from the position-fixing satellites are interrupted for more than a specific period of time, although this period of time varies from one minute to 5 minutes depending on various conditions. The degree of deterioration of the estimated attitude angles is considerably affected by measurement errors of the angular velocity sensor. It is likely that integer ambiguity candidates calculated from estimated values of attitude angles containing such errors do not agree with the true integer ambiguity. The integer ambiguity candidates thus calculated are more likely to disagree with the true integer ambiguity as baseline lengths (distances between multiple antennas mounted on a mobile unit) increase and as the period of interruption of the radio waves increases.

The conventional attitude angle detecting apparatus has a potential to incorrectly determine integer ambiguity candidates and provide wrong attitude angles as mentioned above. If the baseline length is 3 m and the period of interruption of the radio waves from the position-fixing satellites is one minute, for example, the probability of providing incorrect integer ambiguities could be approximately 1%.

SUMMARY OF THE INVENTION

In view of the foregoing, it is an object of the invention to provide an apparatus which can instantly calculate correct integer ambiguities even after interruption of radio waves from position-fixing satellites and quickly detect the heading and attitude of a mobile unit with high precision based on the integer ambiguities so calculated.

In one principal form of the invention, an attitude angle detecting apparatus comprises means for observing a single phase difference or a double phase difference and determining an integer ambiguity from the single or double phase difference, means for calculating the relative position of an antenna other than a reference antenna with respect to the reference antenna from the phase difference of which integer ambiguity has been determined, means for calculating attitude angles of a mobile unit and an error covariance of the attitude angles, and integer ambiguity redetermination means for calculating at least one integer ambiguity candidate from the single or double phase difference based on the attitude angles and the error covariance of the attitude angles and redetermining the integer ambiguity from the integer ambiguity candidate.

The attitude angle detecting apparatus thus constructed calculates estimated values of attitude angles, baseline vectors and floating ambiguities as well as covariances of their estimation errors, calculates a plurality of integer ambiguity candidates based on these estimated values and the covariances of their estimation errors and verifies the integer ambiguity candidates so obtained, whereby the apparatus determines a single integer ambiguity and outputs the attitude angles as shown in FIG. 7.

Since the attitude angles and the attitude angle error covariance are used in producing the integer ambiguity candidates, it is possible to redetermine the integer ambiguity from the single or double phase difference for measuring the relative positions of the antennas quickly and accurately when it is necessary to redetermine the integer ambiguity after recovery from an interruption of radio waves from position-fixing satellites of the Global Positioning System (GPS).

In another principal form of the invention, an attitude angle detecting apparatus comprises means for observing a single phase difference or a double phase difference and determining an integer ambiguity from the single or double phase difference, means for calculating the relative position of an antenna other than a reference antenna with respect to the reference antenna from the phase difference of which integer ambiguity has been determined, means for calculating attitude angles of a mobile unit and an error covariance of the attitude angles and correcting the error covariance of the attitude angles, and integer ambiguity redetermination means for calculating at least one integer ambiguity candidate from the single or double phase difference based on the attitude angles and the corrected error covariance of the attitude angles and redetermining the integer ambiguity from the integer ambiguity candidate.

The attitude angle detecting apparatus thus constructed redetermines the integer ambiguity using the attitude angles which have been obtained when it has become impossible to determine the integer ambiguity from the single or double phase difference as well as the error covariance of the attitude angles corrected by a specific correction term.

With this arrangement, it is possible to redetermine the integer ambiguity quickly and accurately under various conditions by making a specific correction to the attitude angles and the error covariance of the attitude angles.

In one feature of the invention, the attitude angle detecting apparatus uses both the aforementioned means for determining the integer ambiguity from the attitude angles and the error covariance of the attitude angles and the aforementioned means for determining the integer ambiguity from the single or double phase difference, or selectively uses one of these means, in redetermining the integer ambiguity.

With this arrangement, the apparatus redetermines the integer ambiguity in accordance with situations in which the mobile unit is placed. Specifically, the apparatus redetermines the integer ambiguity quickly and accurately by using or not using the attitude angles and the error covariance of the attitude angles when the radio waves from the position-fixing satellites are not received for a specific period of time or over depending on the duration of interruption of the radio waves, for example.

In another feature of the invention, the aforementioned means for calculating the attitude angles of the mobile unit and the error covariance of the attitude angles includes an angular velocity sensor and means for calculating the attitude angles from an output of the angular velocity sensor.

In still another feature of the invention, the aforementioned means for calculating the attitude angles of the mobile unit and the error covariance of the attitude angles includes means for predicting the attitude angles and the error covariance of the attitude angles based on an assumed model depending on conditions of the mobile unit.

By using an angular velocity sensor or an assumed model as the means for calculating the attitude angles of the mobile unit and the error covariance of the attitude angles as stated above, the apparatus can determine the integer ambiguity quickly and accurately.

In yet another feature of the invention, the integer ambiguity redetermination means includes means for calculating floating ambiguities and an error covariance of the floating ambiguities and/or means for determining the integer ambiguity candidate by the Least-squares AMBiguity Decorrelation Adjustment (LAMBDA) method.

With this arrangement, the apparatus can calculate an estimated value of the integer ambiguity and an estimated error covariance and output a plurality of integer ambiguity candidates.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

Figure 1A:
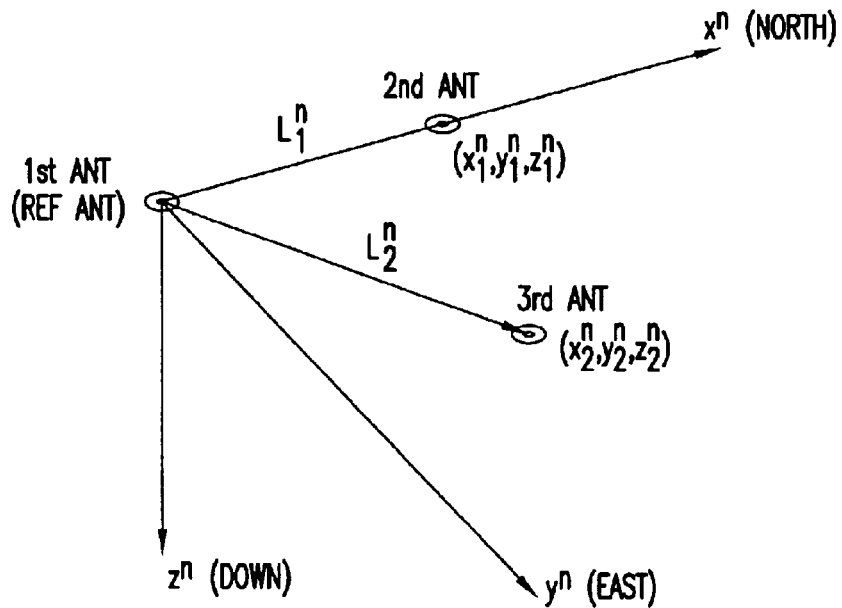
FIGS. 1A and 1B are diagrams showing an example of an antenna layout depicted in a local coordinate system and an antenna coordinate system, respectively.
Figure 1B:
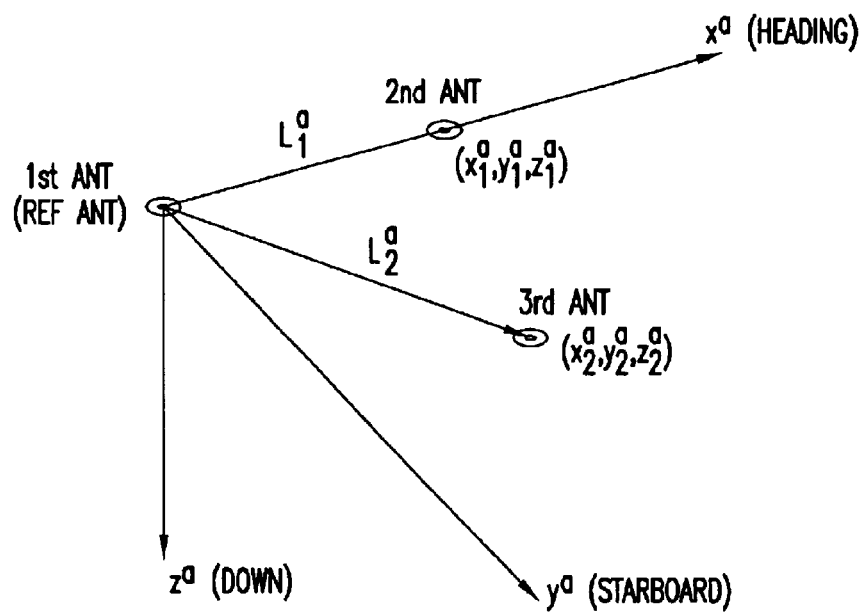

First, an antenna coordinate system, a local coordinate system and coordinate transformation between these two coordinate systems are explained referring to FIGS. 1A and 1B.

FIG. 1A shows an antenna layout depicted in the local coordinate system, in which the x, y and z axes represent north, east and vertical directions, respectively, with the position of a reference antenna (first antenna) located at an origin, for instance.

In FIG. 1A, a point shown by coordinates $(x_1^n, y_1^n, z_1^n)$ is the position of a second antenna, a point shown by coordinates $(x_2^n, y_2^n, z_2^n)$ is the position of a third antenna, $L_1^n$ is a baseline vector taken from the first antenna to the second antenna, and $L_2^n$ is a baseline vector taken from the first antenna to the third antenna. The superscript "n" written to the right of the values of the coordinates and the baseline vectors indicates that these coordinates and baseline vectors are for the local coordinate system.

FIG. 1B shows an antenna layout depicted in the antenna coordinate system, in which the x axis represents the heading (i.e., the direction in which a ship's bow or the nose of an aircraft is oriented), the y axis corresponds to a direction perpendicular to the x axis, and the z axis indicates a direction perpendicular to both the x and y axes, and the position of the reference antenna (first antenna) is taken as an origin, for instance.

In FIG. 1B, a point shown by coordinates $(x_1^a, y_1^a, z_1^a)$ is the position of the second antenna, a point shown by coordinates $(x_2^a, y_2^a, z_2^a)$ is the position of the third antenna, $L_1^a$ is a baseline vector taken from the first antenna to the second antenna, and $L_2^a$ is a baseline vector taken from the first antenna to the third antenna. The superscript "a" written to the right of the values of the coordinates and the baseline vectors indicates that these coordinates and baseline vectors are for the antenna coordinate system.

Equation (1) below is a transformation formula for converting coordinates from the antenna coordinate system to the local coordinate system:

$$\begin{bmatrix} L_1^n \\ L_2^n \\ L_3^n \end{bmatrix} = C_a^n \begin{bmatrix} L_1^a \\ L_2^a \\ L_3^a \end{bmatrix} \quad (1)$$

where $L_3^n$ is a cross product of $L_1^n$ and $L_2^n$, and $L_3^a$ is a cross product of $L_1^a$ and $L_2^a$.

Expressing attitude angles of the antenna coordinate system with respect to the local coordinate system measured by the Global Positioning System (GPS) by Euler angles ($\theta r$, $\theta p$, $\theta y$) defined in a specific order of axial rotation, a coordinate transformation operator $C_a^n$ of equation (1) is expressed by the following matrix:

$$C_a^n = \begin{bmatrix} \cos(\theta_p)\cos(\theta_y) & \sin(\theta_r)\sin(\theta_p)\cos(\theta_y) - \cos(\theta_r)\sin(\theta_y) & \cos(\theta_r)\sin(\theta_p)\cos(\theta_y) + \sin(\theta_r)\sin(\theta_p) \\ \cos(\theta_p)\cos(\theta_y) & \sin(\theta_r)\sin(\theta_p)\sin(\theta_y) + \cos(\theta_r)\cos(\theta_y) & \cos(\theta_r)\sin(\theta_p)\sin(\theta_y) - \sin(\theta_r)\cos(\theta_p) \\ -\sin(\theta_p) & \sin(\theta_r)\cos(\theta_p) & \cos(\theta_r)\cos(\theta_p) \end{bmatrix} \quad (2)$$

where $\theta r$ is the angle of roll, $\theta p$ is the angle of pitch, and $\theta y$ is the angle of yaw. Since the baseline vector obtained by the GPS is a vector in the local coordinate system, $\theta y$ is an attitude angle referenced to true north. Also, $\theta r$ and $\theta p$ are attitude angles referenced to a horizontal plane. The Euler angles ($\theta r$, $\theta p$, $\theta y$) are hereinafter referred to as "GPS attitude angles."

The aforementioned three attitude angles are calculated from the following equations, respectively:

$$\text{Roll: } \theta_r = \tan^{-1}\left[\frac{C_a^n(3,2)}{C_a^n(3,3)}\right] \quad (3)$$

$$\text{Pitch: } \theta_p = \sin^{-1}[C_a^n(3,1)] \quad (4)$$

$$\text{Yaw: } \theta_y = \tan^{-1}\left[\frac{C_a^n(2,1)}{C_a^n(1,1)}\right] \quad (5)$$

Since $L_1^a$, $L_2^a$ and $L_3^a$ of equation (1) are known quantities, $C_a^n$ can be obtained if $L_1^n$, $L_2^n$ and $L_3^n$ are determined from carrier phase difference observables. When the value of $C_a^n$ is obtained, the attitude angles can be calculated from equations (3) to (5) above. Since measuring accuracy of the attitude angles is determined by the accuracy of calculation of the baseline vectors $L_1^n$ and $L_2^n$, or the coordinates ($x_1^n$, $y_1^n$, $z_1^n$) and ($x_2^n$, $y_2^n$, $z_2^n$), an attitude angle determining system usually determines the relative positions of the antennas with high accuracy by observing carrier phase differences rather than by performing position fixing using a pseudorandom noise code. While either a single phase difference method or a double phase difference method may be used for position fixing, the double phase difference method is described in the following discussion:

Equation (6) below is an observation equation applicable to the double phase difference method:

$$\lambda(\nabla \Delta \phi_j^m) = \nabla \Delta \rho_j^m - \lambda(\nabla \Delta N_j^m) + \nabla \Delta e_j^m \quad (6)$$

where m: satellite No.
k: number of satellites
j: baseline vector No.
$\lambda$: carrier wavelength of a received signal
$\nabla \Delta \rho_j^m$: double path difference of a baseline vector $L_j^n$ to a reference satellite sat1 and a satellite satm+1 (m=1, 2, 3)
$\nabla \Delta \phi_j^m$: double phase difference observable for the reference satellite sat1 and the satellite satm+1
$\nabla \Delta N_j^m$: double phase difference integer ambiguity for the reference satellite sat1 and the satellite satm+1
$\nabla \Delta e_j^m$: double phase difference observable noise for the reference satellite sat1 and the satellite satm+1

Figure 2:
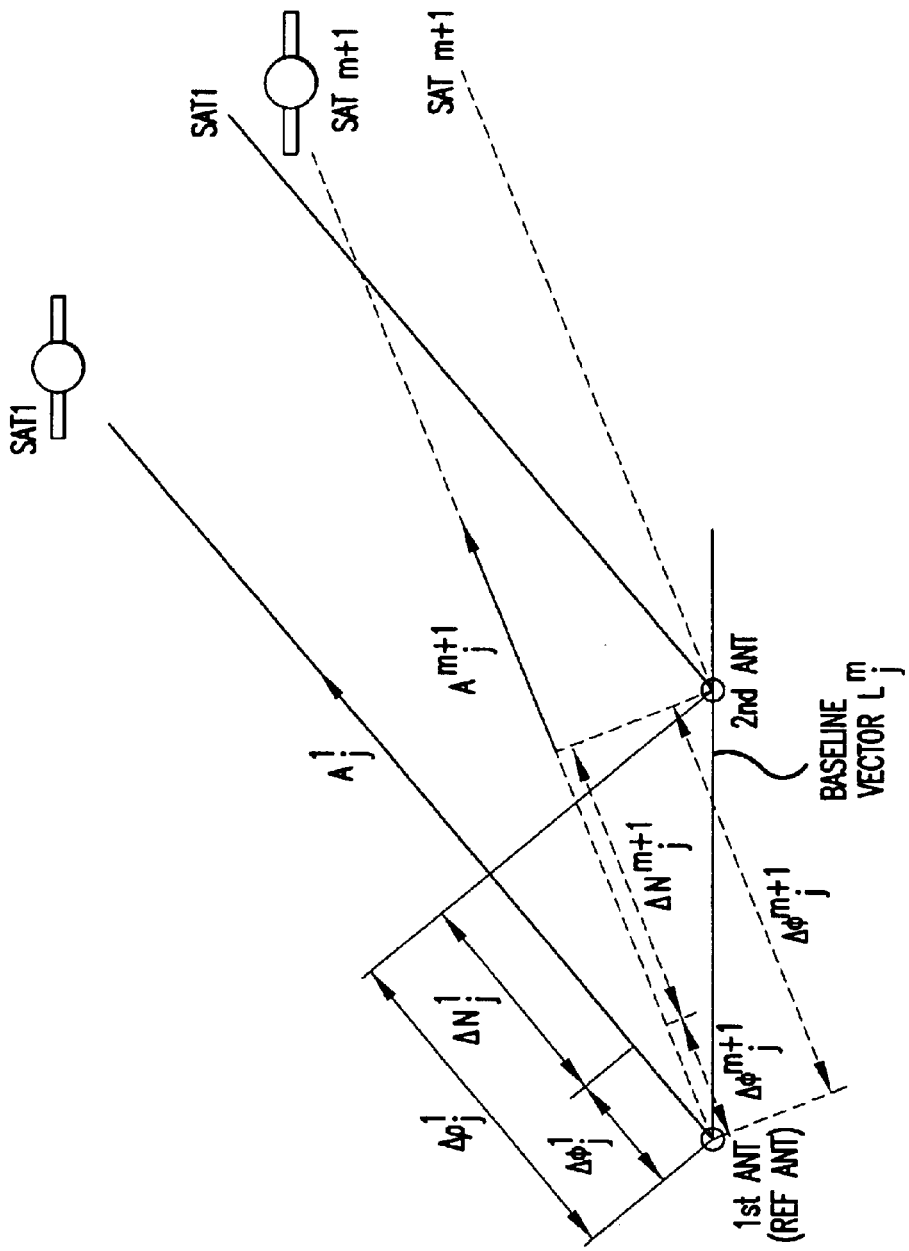
FIG. 2 is a diagram showing the relationship between a baseline vector and a single phase difference and other parameters.

FIG. 2 is a graphical representation of the double phase difference, in which individual symbols have the following meanings:

$\Delta \rho_j^{m+1}$: single path difference of the baseline vector $L_j^n$ to the satellite satm+1
$\Delta \phi_j^{m+1}$: single phase difference observable of the baseline vector $L_j^n$ to the satellite satm+1
$\Delta N_j^{m+1}$: single phase difference integer ambiguity of the baseline vector $L_j^n$ to the satellite satm+1
$\Delta e_j^{m+1}$: single phase difference observable noise of the baseline vector $L_j^n$ to the satellite satm+1

Also, the individual symbols representing the aforementioned variables related to the single phase difference and double phase difference have the following relationship:

$\nabla \Delta \rho_j^m = \Delta \rho_j^{m+1} - \Delta \rho_j^1$ $\nabla \Delta \phi_j^m = \Delta \phi_j^{m+1} - \Delta \phi_j^1$ $\nabla \Delta N_j^m = \Delta N_j^{m+1} - \Delta N_j^1$ $\nabla \Delta e_j^m = \Delta e_j^{m+1} - \Delta e_j^1$ Since the double phase difference $\nabla \Delta \rho_j^m$ is a product of a direction cosine difference matrix and baseline vectors, it is expressed as $\nabla \Delta \rho_j^m = \Delta A_j^m L_j^n$ (j=1, 2), where both $\Delta A_j^m$ and $L_j^n$ are functions of the coordinates ($x_1^n$, $y_1^n$, $z_1^n$). Therefore, from equation (6), $L_j^n$, or the coordinates ($x_1^n$, $y_1^n$, $z_1^n$), are unknown quantities. Since there remain three unknown quantities ($x_1^n$, $y_1^n$, $z_1^n$) if integer ambiguities are predetermined by one method or another, it is possible to determine the coordinates ($x_1^n$, $y_1^n$, $z_1^n$) if at least three observables $\nabla \Delta \phi_j^m$ are obtained.

Expressing now coordinate vectors of a given baseline vector L in the local coordinate system and the antenna coordinate system as defined in FIGS. 1A and 1B by $X^n$ and $X^a$, respectively, and a coordinate transformation matrix (3×3) by $C_a^n$, their relationship is expressed by equation (7) below:

$$X^n = C_a^n X^a \quad (7)$$

Thus, the covariance of errors of $X^n$, i.e., $Qx = E[\delta x (\delta x)^T]$, is expressed by equation (8) below, in which $\delta x$ represents an error of $X^n$, $E[\cdot]$ represents averaging operation and $(\cdot)^T$ represents a transposed matrix:

$$Qx = H Q_\theta H^T \quad (8)$$

where $$Qx = \begin{bmatrix} \sigma_{xx}^2 & \sigma_{xy} & \sigma_{xz} \\ \sigma_{yx} & \sigma_{yy}^2 & \sigma_{yz} \\ \sigma_{zx} & \sigma_{zy} & \sigma_{zz}^2 \end{bmatrix}, Q_\theta = \begin{bmatrix} \sigma_r^2 & \sigma_{rp} & \sigma_{ry} \\ \sigma_{pr} & \sigma_p^2 & \sigma_{py} \\ \sigma_{yr} & \sigma_{yp} & \sigma_y^2 \end{bmatrix} \quad (9)$$

$$H = \begin{bmatrix} \frac{\partial C_a^n}{\partial \theta_r} X^a & \frac{\partial C_a^n}{\partial \theta_p} X^a & \frac{\partial C_a^n}{\partial \theta_y} X^a \end{bmatrix}$$

The error of the baseline vector position is $\delta x$ as stated above. Expressing an error obtained by projecting $\delta x$ in the direction of sight of a satellite by $\delta \rho$, the relationship between $\delta x$ and $\delta \rho$ is expressed by equation (10) below:

$$\delta \rho = \Delta A \delta x \quad (10)$$

Here, $\Delta A$ is a direction cosine difference matrix taken from double phase differences in the direction of the satellite. Provided that the error of double phase difference is $\delta(\nabla \Delta \phi)$ and the error of integer ambiguity is $\delta(\nabla \Delta N)$, there is a relation expressed by equation (11) below among $\delta \rho$, $\delta(\nabla \Delta \phi)$ and $\delta(\nabla \Delta N)$:

$$\delta \rho = \lambda[\delta(\nabla \Delta \phi) + \delta(\nabla \Delta N)] \quad (11)$$

From equations (10) and (11), the relation between the baseline vector position error and the integer ambiguity error is expressed by equation (12) below:

$$\delta(\nabla \Delta N) = -\delta(\nabla \Delta \phi) + \lambda^{-1} \Delta A \delta x \quad (12)$$

Expressing the covariance of double phase difference errors by $Q\nabla\Delta\phi$ and the covariance of integer ambiguity errors by $Q\nabla\Delta N$, we obtain equation (13) below from equation (12) since the double phase difference errors and the integer ambiguity errors are not correlated:

$$Q_{\nabla\Delta N} = Q_{\nabla\Delta\phi} + \lambda^{-2} \Delta A Q_x (\Delta A)^T \quad (13)$$

Also, from equations (8) and (10) above, the relationship between attitude angle errors and the integer ambiguity errors is expressed by equation (14) below:

$$Q_{\nabla\Delta N} = Q_{\nabla\Delta\phi} + \lambda^{-2} \Delta A H Q_\theta H^T (\Delta A)^T \quad (14)$$

If the integer ambiguity is already determined, the integer ambiguity error $\delta(\nabla \Delta N)$ is 0, so that the baseline vector position error $\delta x$ is expressed as follows from equations (10) and (11):

$$\delta x = \lambda^2 \Delta A^+ \delta(\nabla \Delta \phi) \quad (15)$$

$$\Delta A^+ = [(\Delta A)^T \Delta A]^{-1} (\Delta A)^T$$

Also, from equation (8), the relationship between the covariance $Qx$ of baseline vector errors and the covariance $Q_\theta$ of attitude angle errors is expressed by equation (16) below:

$$Q_\theta = H^+ Q_x (H^+)^T \quad (16)$$

$$H^+ = [H^T H]^{-1} H^T$$

Thus, from equations (15) and (16) above, the covariance $Q_\theta$ of attitude angle errors is expressed by equation (17) below:

$$Q_\theta = \lambda^2 H^+ \Delta A^+ Q_{\nabla\Delta\phi} (\Delta A^+)^T (H^+)^T \quad (17)$$

If there exists an inverse matrix $H^{-1}$ of the matrix H, equation (17) above is identical to equation (18) below:

$$Q_\theta = \lambda^2 H^{-1} \Delta A^+ Q_{\nabla\Delta\phi} (\Delta A^+)^T (H^{-1})^T \quad (18)$$

Here, the double phase difference error covariance $Q\nabla\Delta\phi$ can be preestimated by a method described below, for example.

First, the baseline vector is measured with an apparatus held at a fixed location and observed data (double phase differences and direction cosine difference matrix) are recorded. Then, assuming that a double phase difference from the measured baseline vector and the direction cosine difference matrix is a true value, variances of errors between that value and the observed double phase differences is calculated. A matrix of which diagonal elements are the variances of errors so calculated is used as the aforementioned double phase difference error covariance $Q\nabla\Delta\phi$.

Therefore, when the integer ambiguity is already determined, it is possible to calculate the attitude angles from equations (3), (4) and (5) and the covariance of attitude angle errors from equation (17).

Furthermore, by integrating the apparatus with an angular velocity sensor, it is possible to determine the attitude angles with higher accuracy. Thus, compared to a case where the angular velocity sensor is not used, it is possible to obtain more accurate attitude angles and smaller covariance of the attitude angle errors.

Although it becomes impossible to calculate the attitude angles and the attitude angle error covariance from equations (3), (4), (5) and (17) when radio waves from position-fixing satellites are interrupted by an obstacle like a building, the attitude angles and the attitude angle error covariance can be obtained by performing strapdown calculation using angular velocities obtained by the angular velocity sensor.

During the execution of strapdown operation, the attitude angle error covariance is obtained by adding a correction value, which is obtained by multiplying the duration of interruption of GPS signals by a specific constant β, to the diagonal elements of the attitude angle error covariance which have been obtained from equation (17) prior to the GPS signal interruption. Here, the constant β is a preset value determined according to such parameters as an angular velocity sensor measurement error, an angular velocity sensor offset bias estimation error and update interval.

It is also possible to predict the attitude angles and the attitude angle error covariance during the GPS signal interruption by the following method, for example, instead of using the angular velocity sensor.

Specifically, on the assumption that the attitude angles which have been obtained from equations (3), (4) and (5) prior to the GPS signal interruption remain unchanged immediately after the GPS signal interruption, those attitude angles are initially used as predicted values of the attitude angles.

Then, a value obtained by multiplying the duration of the GPS signal interruption by a specific constant γ is added to the diagonal elements of the attitude angle error covariance which have been obtained from equation (17) prior to the GPS signal interruption in order to obtain a predicted value of the attitude angle error covariance. Here, the constant γ is a preset value determined according to such parameters as the magnitude of angular velocities and the frequency of the occurrence of the angular velocities. It is also possible to obtain the attitude angle error covariance by making this kind of correction.

When the need arises to redetermine an integer ambiguities due to the occurrence of a cycle slip, for instance, integer ambiguity candidates are produced from the standard deviation of floating ambiguities obtained from the attitude angles and a candidate which is considered most reliable is selected as the potentially true integer ambiguity. As a result, it is possible to determine the integer ambiguity with smaller risk of errors compared with a case where the floating ambiguities obtained from the attitude angles are rounded to integer values.

While the foregoing discussion deals with a case where there are three antennas, integer ambiguities can be calculated in the same way as described above when there are only two antennas including the first and second antennas. This is made possible by rewriting equations (3), (4), (5) and (9) as follows.

Since there is only one baseline vector in this case, the transformation formula (equation (1)) for converting coordinates from the antenna coordinate system to the local coordinate system is rewritten as follows:

$$L_1^n = C_a^n L_a^n, \quad L_1^n = \begin{bmatrix} x_1^n \\ y_1^n \\ z_1^n \end{bmatrix}, \quad L_1^a = \begin{bmatrix} d \\ 0 \\ 0 \end{bmatrix} \tag{19}$$

where d is the length of the baseline vector $L_1^a$.

As the number of antennas is reduced to two, the angle of roll $\theta r$ disappears while the angle of pitch $\theta p$ and the angle of yaw $\theta y$ are expressed by equations (20) and (21) below:

Pitch: $\theta_p = \sin^{-1}[-z_1^n/d]$ \hfill (20)

Yaw: $\theta_y = \tan^{-1}[y_1^n/x_1^n]$ \hfill (21)

Also, error variance matrices Qx and $Q_\theta$ and a unit direction cosine difference matrix H are expressed by equations (22) below:

$$Qx = \begin{bmatrix} \sigma_{xx}^2 & \sigma_{xy} & \sigma_{xz} \\ \sigma_{yx} & \sigma_{yy}^2 & \sigma_{yz} \\ \sigma_{zx} & \sigma_{zy} & \sigma_{zz}^2 \end{bmatrix}, \quad Q_\theta = \begin{bmatrix} \sigma_p^2 & \sigma_{py} \\ \sigma_{yp} & \sigma_y^2 \end{bmatrix}, \tag{22}$$

$$H = \begin{bmatrix} \frac{\partial(C_a^n X^a)}{\partial \theta_p} & \frac{\partial(C_a^n X^a)}{\partial \theta_y} \end{bmatrix} \quad C_a^n X^a = \begin{bmatrix} d\cos(\theta_p)\cos(\theta_y) \\ d\cos(\theta_p)\sin(\theta_y) \\ -d\sin(\theta_p) \end{bmatrix}$$

Floating ambiguities are calculated as follows from attitude angles.

Since the position $(x_j^a, y_j^a, z_j^a)$ of a baseline vector $L_j^a$ (j=1, 2) in the antenna coordinate system is known, the position $(x_j^n, y_j^n, z_j^n)$ of the baseline vector $L_j^n$ (j=1, 2) in the local coordinate system is obtained from the attitude angles detected by the angular velocity sensor using equations (2) and (7).

Single phase difference $\Delta\rho_j^m$ of each satellite is calculated backward from the position $(x_j^n, y_j^n, z_j^n)$ using equation (23) below:

$$\Delta\sigma_j^m = A_j^m X_j^n \ (m = 1, 2, 3, 4, j = 1, 2) \tag{23}$$

Since $A_j^m$ is a vector in the direction of viewing field of a satellite m of the baseline vector $L_j^n$, it can be determined from the position $(x_m^n, y_m^n, z_m^n)$ of each satellite and the position $(x_j^n, y_j^n, z_j^n)$ in the local coordinate system, where m is the number of the satellite used and j is the number of the baseline vector.

The observation equation of the single phase difference is expressed by equation (24) below. Therefore, if the single phase difference $\Delta\phi_j^m$ is an observable, it is possible to calculate floating ambiguities $\Delta n_j^m$ of the single phase difference for the satellite m from this equation:

$$\lambda\Delta n_j^m = \Delta\rho_j^m - \lambda\Delta\phi_j^m + \Delta e_j^m (m = 1, 2, 3, 4, j = 1, 2) \tag{24}$$

Expressing the covariance of single phase difference errors by $Q\Delta\phi$ and substituting $Q\Delta n$ for $Q\nabla\Delta N$ and $Q\Delta\phi$ for $Q\nabla\Delta\phi$ in equation (14), the covariance of errors $Q\Delta n$ of floating ambiguities of single phase differences has a relationship expressed by equation (25) below with the attitude angle error covariance $Q_\theta$:

$$Q_{\Delta n} = Q_{\Delta\phi}\lambda^{-2}\Delta AHQ_\theta H^T A^T \tag{25}$$

Since the attitude angle error covariance $Q_\theta$ can be calculated from the earlier-mentioned equation (17), it is possible to calculate the floating ambiguity error covariance $Q\Delta n$ from equation (25) above.

Also, the standard deviation $\sigma\Delta n$ of floating ambiguities can be obtained as a root of diagonal elements of the floating ambiguity error covariance $Q\Delta n$.

Since the floating ambiguities $\Delta n$ and the floating ambiguity error covariance $Q\Delta n$ are determined as described above, an integer value existing between a value obtained by adding the aforementioned standard deviation $\sigma\Delta n$ to the floating ambiguity $\Delta n$ and a value obtained by subtracting the standard deviation $\sigma\Delta n$ from the floating ambiguity $\Delta n$ can be calculated as an integer ambiguity candidate of the single phase difference.

As an alternative to the aforementioned method of determining the integer ambiguity using the floating ambiguity $\Delta n$ and the floating ambiguity error covariance $Q\Delta n$, it is possible to use the LAMBDA method.

In the LAMBDA method, integer ambiguity candidates are calculated by inequality (26) below:

$$(\Delta n - \Delta N)Q_{\Delta n}(\Delta n - \Delta N) \leq \chi^2 \tag{26}$$

where $\Delta N$ is an integer ambiguity candidate, $\Delta n$ is a floating ambiguity, $Q\Delta n$ is a floating ambiguity error covariance and $\chi^2$ is the threshold of a norm.

Specifically, each integer ambiguity candidate is substituted in the inequality (26) which uses the floating ambiguity $\Delta n$ and the floating ambiguity error covariance $Q\Delta n$. If the calculated value of the left side of the inequality (26) is equal to or smaller than the threshold $\chi^2$ of the norm, the integer ambiguity candidate $\Delta N$ is regarded as true and the result is calculated, in which the threshold $\chi^2$ of the norm is set according to search volume in the actual apparatus.

In the case of the double phase difference method, the integer ambiguity candidate $\Delta N$ can be calculated from equation (6) using double phase difference floating ambiguity $\nabla\Delta N$. Therefore, the invention is applicable to both the single phase difference method and the double phase difference method.

Figure 3:
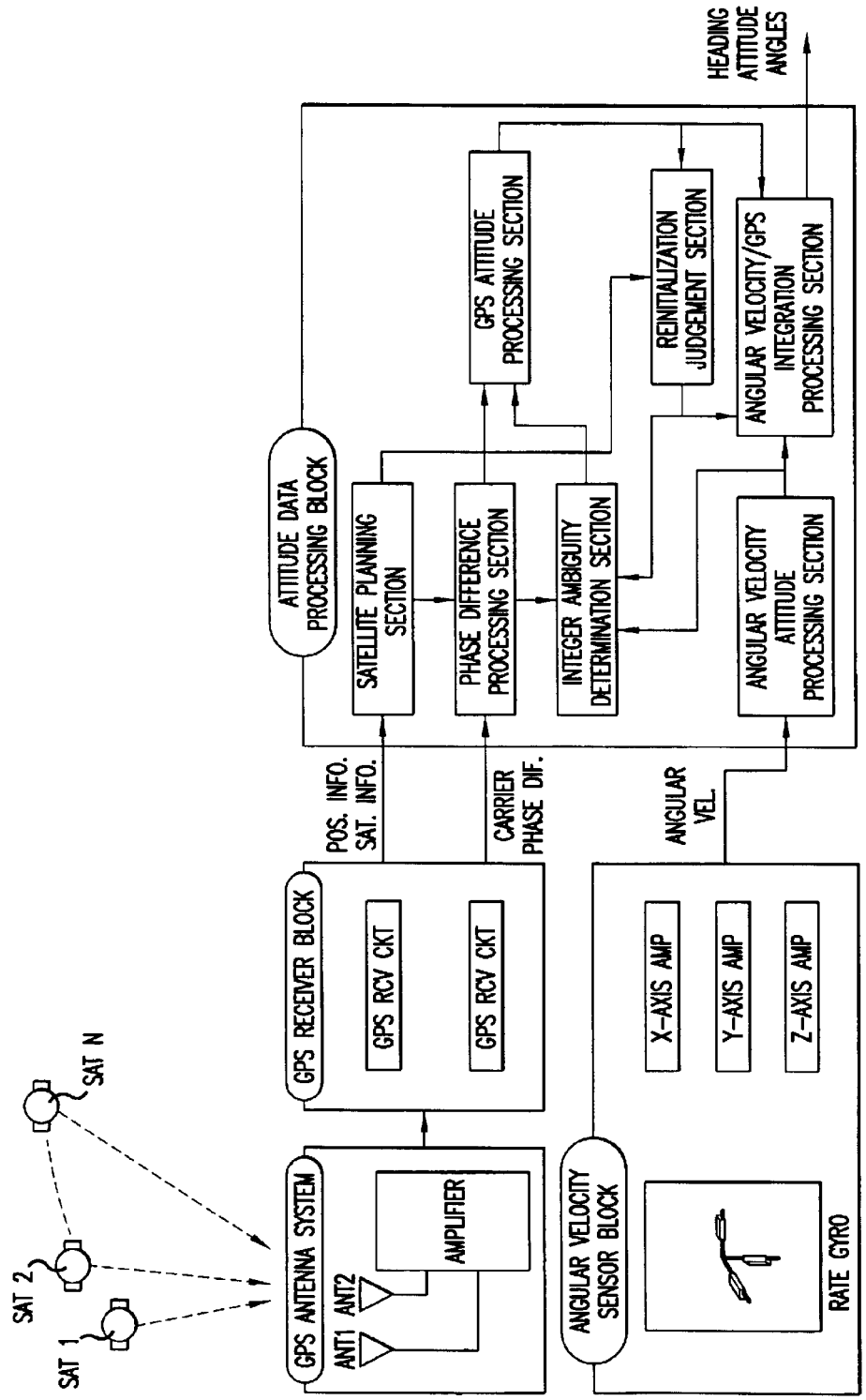
FIG. 3 is a block diagram showing the construction of an attitude determining system for a mobile unit according to the invention.
Figure 4:
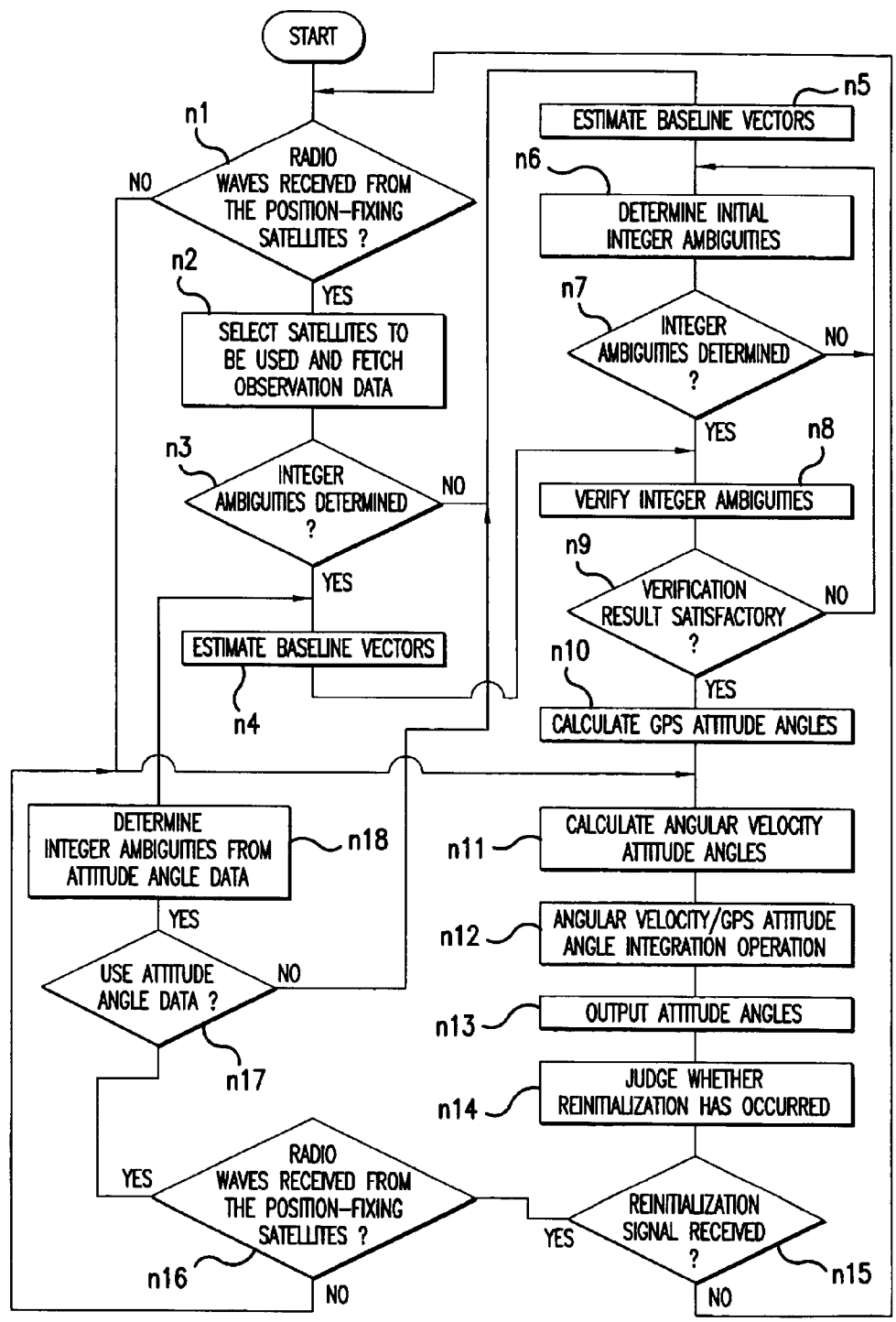
FIG. 4 is a flowchart showing operations performed by a reinitialization judgment section and an angular velocity/GPS integration processing section of an attitude data processing block shown in FIG. 3.

The general configuration of an attitude angle detecting apparatus of the invention for detecting the heading and attitude of a mobile unit is now described referring to FIGS. 3 and 4.

FIG. 3 is a block diagram of the attitude determining system. Designated by sat1, sat2 and satN are GPS satellites (position-fixing satellites). A GPS antenna system including two antennas ANT1, ANT2 receives radio waves transmitted from the position-fixing satellites sat1, sat2 and satN and downconverts received radio wave signals into intermediate frequency (IF) signals. The IF signals are amplified by an amplifier built in the GPS antenna system and delivered to a GPS receiver block. Based on the signals received by the individual antennas ANT1, ANT2, the GPS receiver block calculates the positions of the antennas ANT1, ANT2 and carrier phase differences, and outputs these data together with information on the positions of the individual satellites to an attitude data processing block at specific time intervals. Since the antenna positions obtained by position fixing, ephemeris information, etc. comply with the coordinate system of the GPS, these data are converted into the local coordinate system in the GPS receiver block or in the attitude data processing block. In the following discussion, it is assumed that the data are converted in the GPS receiver block.

A satellite planning section of the attitude data processing block selects satellites to be used based on the satellite ephemeris information and the antenna positions and gives the antenna positions and information on the selected satellites to a phase difference processing section. The phase difference processing section calculates observed quantities of single (or double) phase differences from the information received from the satellite planning section and carrier phase difference signals received from the GPS receiver block, and delivers the resultant data to an integer ambiguity determination section. The integer ambiguity determination section determines integer ambiguities of the single (or double) phase differences of the relevant satellites, evaluates the goodness of the integer ambiguities, and gives integer ambiguity information to a GPS attitude processing section. The GPS attitude processing section calculates baseline vectors in the local coordinate system from the integer ambiguities and carrier phase difference observables output from the phase difference processing section using a known method. Attitude angles are calculated from the baseline vectors for the local coordinate system thus obtained and the known baseline vectors for the antenna coordinate system from equations (1) to (5). The attitude angles obtained by the GPS are hereinafter referred to as "GPS attitude angles."

An angular velocity sensor block includes a rate gyro for detecting angular velocities around three perpendicular axes as well as an x-axis amplifier, a y-axis amplifier and a z-axis amplifier for amplifying angular velocity outputs. This angular velocity sensor block outputs data on the angular velocities around the individual axes to an angular velocity attitude processing section of the attitude data processing block.

Specifically, the angular velocity sensor block outputs angular velocities $\omega^s_{is}$ about axes of an angular velocity sensor coordinate system referenced to a right-handed inertial coordinate system whose x axis coincides with the line of intersection of the earth's equatorial plane and a meridian plane passing through the vernal equinox and y axis coincides with an eastward-directed line perpendicular to the x axis. What are needed here are angular velocities $\omega^s_{ns}$ about coordinate axes of the angular velocity sensors in the local coordinate system. The relationship between $\omega^s_{is}$ and $\omega^s_{ns}$ is given by $\omega^s_{ns}=\omega^s_{is}-\omega^s_{in}$, where $\omega^s_{in}$ is an angular velocity obtained when an angular velocity in the local coordinate system referenced to the inertial coordinate system is observed from the angular velocity sensor coordinate system. Since $\omega^s_{is}>>\omega^s_{in}$ in the case of a low-speed mobile unit like a ship, $\omega^s_{in}$ can be disregarded. In the case of a high-speed mobile unit like an aircraft, $\omega^s_{ns}$ is calculated from the position of the mobile unit using a known method.

The angular velocity attitude processing section calculates the attitude angles using Euler's equation or Gilmore's algorithm which are known. The attitude angles thus obtained are hereinafter referred to as "angular velocity attitude angles."

An angular velocity/GPS integration processing section combines the angular velocity attitude angles and the GPS attitude angles and eventually outputs individual attitude angles including the angles of roll, pitch and yaw.

FIG. 4 is a flowchart showing operations performed by a reinitialization judgment section and the angular velocity/GPS integration processing section of the attitude data processing block shown in FIG. 3.

Upon receiving radio waves from the position-fixing satellites (step n1), the attitude data processing block selects satellites to be used for position fixing and takes in observation data obtained from the radio waves received from the selected satellites (step n2). If integer ambiguities are not determined yet under initial conditions, baseline vectors are estimated for the individual antennas and floating ambiguities are obtained. A Kalman filter or the least squares method, for instance, is used for this estimation. Subsequently, the integer ambiguities are determined by rounding the floating ambiguities to integer values using a known method (steps n4→n5→n6→n7→n6 . . . ).

Next, the goodness of the estimated integer ambiguities is verified by conducting a $\chi^2$-test or and judging whether baseline lengths coincide with actual values (step n8). If the result of verification is unsatisfactory, the aforementioned operation for determining the integer ambiguities is reexecuted (steps n9→n6 . . . ). If the result of verification is satisfactory, baseline vectors are determined using the integer ambiguities so obtained as known quantities, and GPS attitude angles are calculated from relative positions of the individual antennas (step n10). Then, angular velocity attitude angles are calculated from angular velocities around the three axes detected by the angular velocity sensors at the same time that the GPS attitude angles were calculated (step n11).

Next, the angular velocity/GPS integration processing section performs an angular velocity/GPS attitude angle integration operation to integrate the GPS attitude angles and the angular velocity attitude angles and outputs the attitude angles so integrated (steps n12→n13). Specifically, the angular velocity attitude angles are converted to attitude angles defined in the same local coordinate system as for the GPS attitude angles by using the GPS attitude angles as initial values of strapdown of the angular velocity attitude angles. Also, angular velocity sensor errors are estimated from differences between the GPS attitude angles and the angular velocity attitude angles in step n12. Further, the attitude angle error covariance is calculated by using equations (17) and (25).

One example of calculation method used in the aforementioned integration operation is to calculate the attitude angles and the attitude angle error covariance using a Kalman filter which outputs attitude angles as a state.

The aforementioned GPS attitude angles are attitude angles of the axes of the antenna coordinate system referenced to the local coordinate system, and the angular velocity attitude angles are attitude angles of the axes of the angular velocity sensor coordinate system referenced to the local coordinate system. Although it is desirable to install the antennas and angular velocity sensors on the mobile unit such that the axes of the antenna coordinate system and the axes of the angular velocity sensor coordinate system exactly match each other, this is difficult in practice. Accordingly, a deviation of the coordinate axes is compensated for by a mathematical operation involving rotation of the coordinate axes.

The aforementioned estimation of the angular velocity sensor errors is made by estimating biases and drift errors which constitute the angular velocity sensor errors using information on the differences between the GPS attitude angles and the angular velocity attitude angles. The angular velocity sensor errors thus estimated are removed from the angular velocity attitude angles.

Subsequently, the reinitialization judgment section of the attitude data processing block judges whether any cycle slips have occurred (steps n13→n14). If the reinitialization judgment section judges that a cycle slip has occurred, integer ambiguities are determined and baseline vectors are estimated using the attitude angles and the attitude angle error covariance calculated as described above (steps n15→n16→n17→n18→n4).

Figure 5:
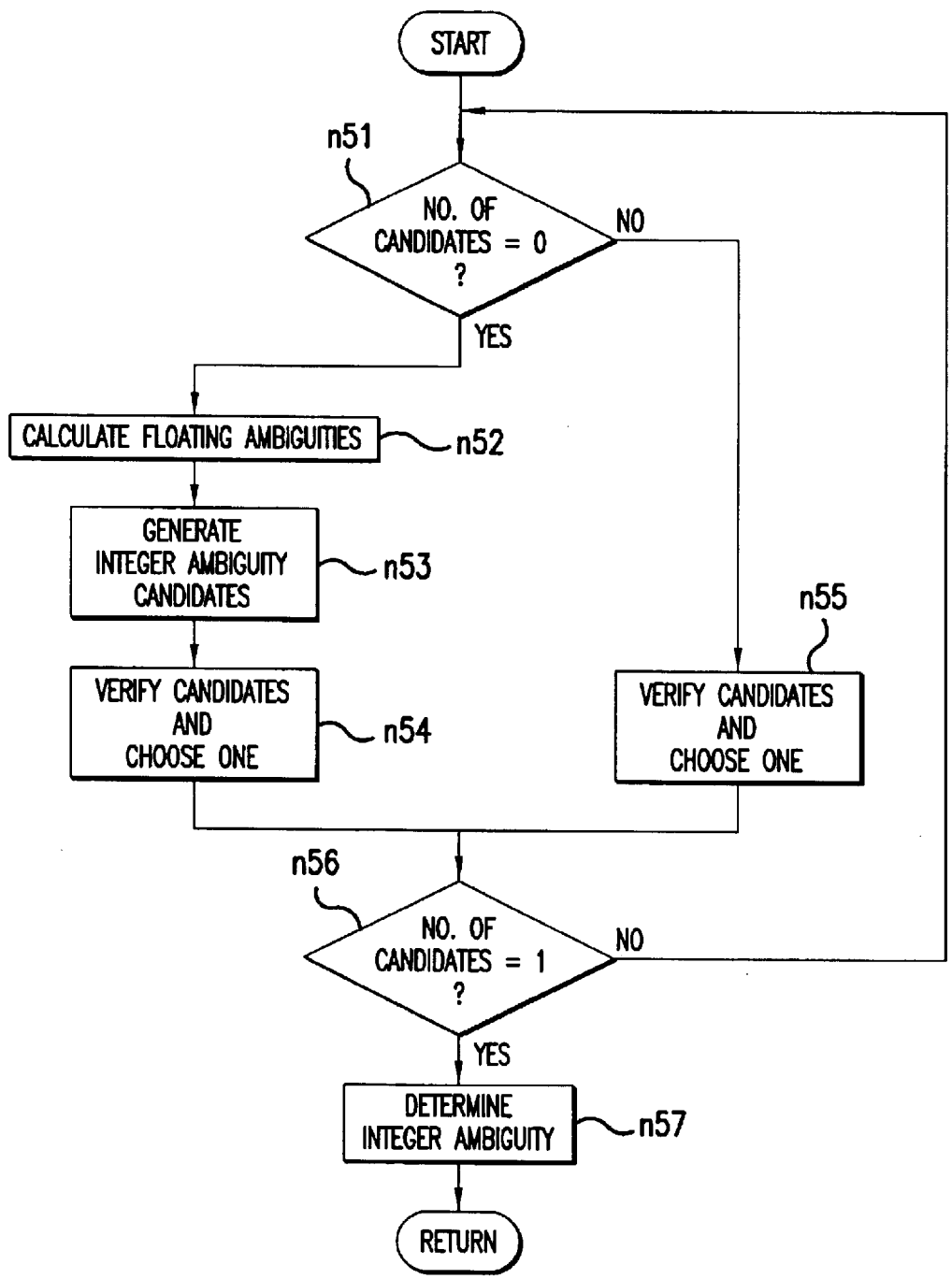
FIG. 5 is a flowchart showing a procedure of FIG. 4 for determining integer ambiguities from attitude angles and attitude angle error covariance.
Figure 6:
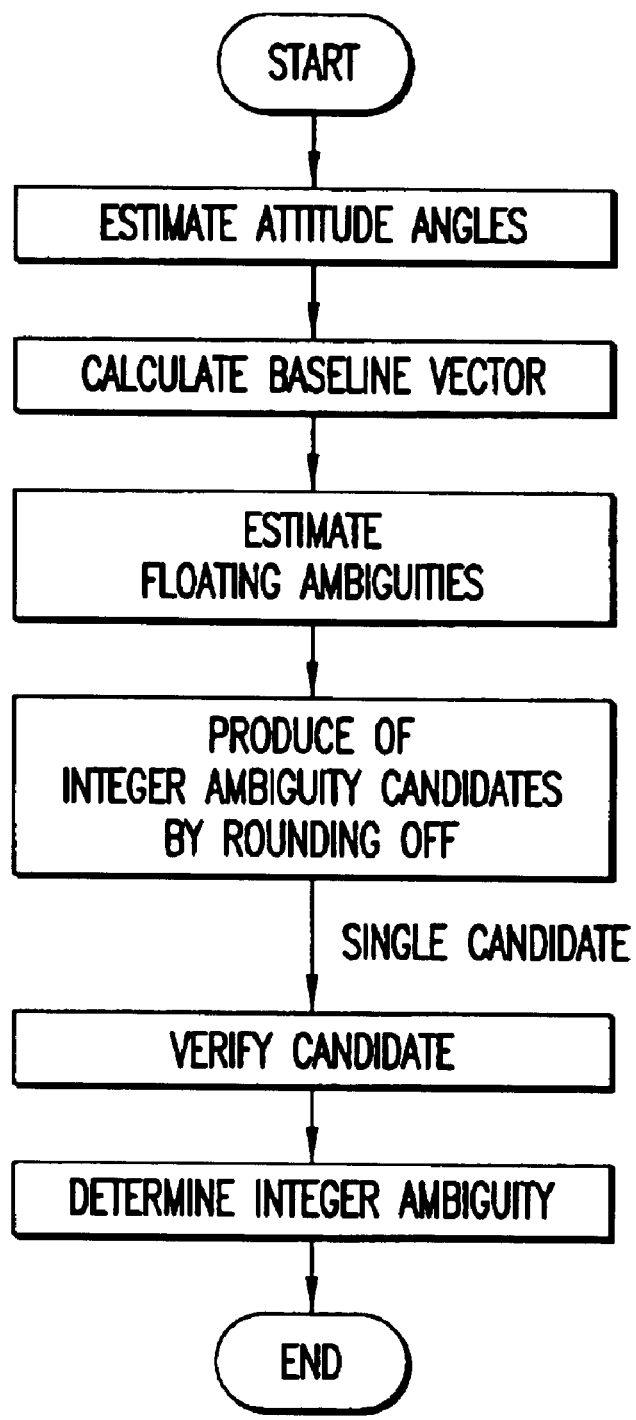
FIG. 6 is a flowchart generally showing a conventional procedure for determining integer ambiguities from attitude angles.
Figure 7:
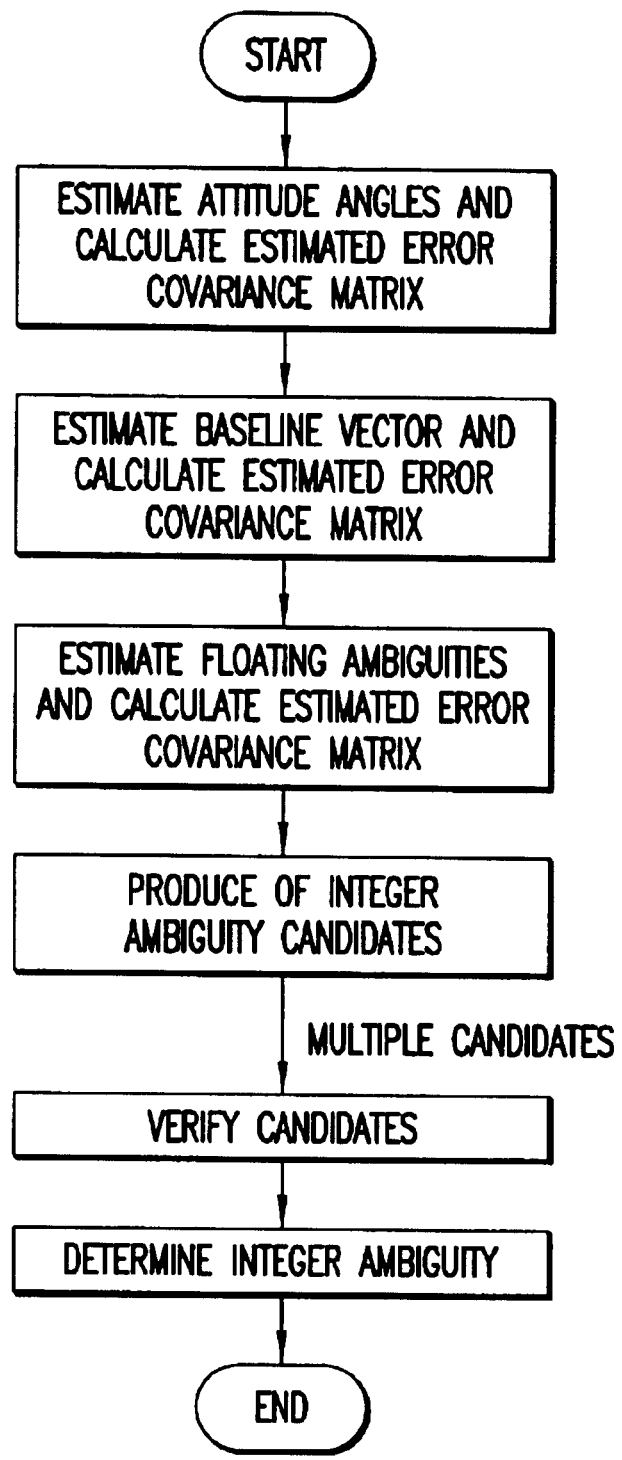
FIG. 7 is a flowchart generally showing a procedure for determining the integer ambiguities from the attitude angles according to the invention.

FIG. 5 is a flowchart showing how the integer ambiguity determination section determines integer ambiguities from the attitude angles and the attitude angle error covariance upon receipt of a reinitialization signal.

Upon receiving a reinitialization signal, the integer ambiguity determination section begins operation for determining the integer ambiguities from the attitude angles and the attitude angle error covariance. Should there exist integer ambiguity candidates, they are verified to choose one potentially true candidate (steps n51→n55). If there is no integer ambiguity candidate, on the other hand, candidates are generated by a method shown below and one potentially true candidate is selected through verification.

When the attitude angles have been determined, it is possible to calculate baseline vectors as described above. Floating ambiguities are calculated from the baseline vectors so obtained (step n52). At least one integer ambiguity candidate is then generated based on the floating ambiguities so obtained, the covariance of errors of the floating ambiguities and the standard deviation of the floating ambiguities, and each integer ambiguity candidate is verified as described above (steps n53→n54). When one potentially true candidate has been chosen through verification, it is determined as the integer ambiguity (steps n56→n57). The aforementioned process of generation and verification of the integer ambiguities is repeatedly executed until one potentially true candidate is selected (steps n56→n51 . . . ).

If radio waves are received from GPS position-fixing satellites in the aforementioned process of reinitialization shown in FIG. 4, integer ambiguities are determined using the attitude angles. If no radio waves are received from the GPS position-fixing satellites, on the other hand, attitude angles are calculated and output by using the GPS attitude angles which have been obtained immediately before the interruption of GPS signals as initial values of strapdown of the angular velocity attitude angles (steps n16→n11→n12→n13). The attitude angle error covariance is used after making the aforementioned correction as necessary.

Although it is possible to determine the integer ambiguities more quickly when attitude angle data obtained from the radio waves received from the GPS position-fixing satellites is used as compared with a case where the attitude angle data is not used, the attitude angle error covariance increased when the duration of the GPS signal interruption increases (e.g., 15 minutes or over). Therefore, it takes a longer time to determine the integer ambiguities when using the attitude angle error covariance as compared with a case where the attitude angle error covariance is not used. Furthermore, if the integer ambiguities are determined in this way, there arises an increased possibility of incorrectly determining the integer ambiguities. For this reason, a judgment is made to choose whether to use the attitude angles and the attitude angle error covariance for determining the integer ambiguities (steps b17→n18).

The duration of the GPS signal interruption may be used as a criterion in judging whether to use the attitude angle data in step b17. For example, the attitude angle data is not used when the radio waves from the GPS position-fixing satellites are not received for a specific period of time or over, whereas the attitude angle data is used when the duration of the GPS signal interruption does not exceed this specific period of time. An alternative to this judgment criterion is to use the attitude angle data when the attitude angle error covariance is equal to or smaller than a specific threshold value and not to use the attitude angle data when the attitude angle error covariance exceeds the threshold value. Another alternative is to determine the integer ambiguities by a procedure using the attitude angle data and a procedure not using the attitude angle data and employ the integer ambiguities determined by one of these procedures whichever provides the solutions earlier. Still another alternative is to determine the integer ambiguities by alternately using these procedures.

It has been ascertained by experiments that the integer ambiguities can be correctly determined by using the attitude angles and the attitude angle error covariance under the same conditions as used in the earlier-mentioned prior art.

According to the invention, it is possible to determine the integer ambiguities quickly and accurately by using the attitude angles and the attitude angle error covariance when it is necessary to perform reinitialization after recovery from the GPS signal interruption, for example.

It is also possible to determine the integer ambiguities quickly and accurately by not using the attitude angle data or by adding an appropriate correction term to calculation process even when the attitude angle error covariance has increased.

Furthermore, it is possible to determine the integer ambiguities quickly and accurately by not using the attitude angles and the attitude angle error covariance depending on conditions.

What is claimed is:

1. An attitude angle detecting apparatus which receives radio waves from a plurality of position-fixing satellites by means of at least two antennas mounted on a mobile unit, one of the antennas being used as a reference antenna, determines the relative position of the antenna other than the reference antenna with respect to the reference antenna, and determines the heading and attitude of the mobile unit from said relative position of the antenna, said attitude angle detecting apparatus comprising:

means for observing a single phase difference or a double phase difference and determining an integer ambiguity from the single or double phase difference;

means for calculating said relative position from the phase difference of which integer ambiguity has been determined;

means for calculating attitude angles of the mobile unit and error covariance of the attitude angles; and integer ambiguity redetermination means for calculating at least one integer ambiguity candidate from the single phase difference for each of the position-fixing satellites or from the double phase difference for each pair of the position-fixing satellites based on the attitude angles and the error covariance of the attitude angles and redetermining the integer ambiguity from the integer ambiguity candidate.

2. The attitude angle detecting apparatus according to claim 1, wherein said means for calculating the attitude angles of the mobile unit and the error covariance of the attitude angles includes an angular velocity sensor and means for calculating the attitude angles from an output of said angular velocity sensor.

3. The attitude angle detecting apparatus according to claim 2, wherein said integer ambiguity redetermination means includes means for calculating floating ambiguities and an error covariance of the floating ambiguities.

4. The attitude angle detecting apparatus according to claim 2, wherein said integer ambiguity redetermination means includes means for determining the integer ambiguity candidate by the LAMBDA method.

5. The attitude angle detecting apparatus according to claim 1, wherein said means for calculating the attitude angles of the mobile unit and the error covariance of the attitude angles includes means for predicting the attitude angles and the error covariance of the attitude angles based on an assumed model depending on conditions of the mobile unit.

6. The attitude angle detecting apparatus according to claim 5, wherein said integer ambiguity redetermination means includes means for calculating floating ambiguities and an error covariance of the floating ambiguities.

7. The attitude angle detecting apparatus according to claim 5, wherein said integer ambiguity redetermination means includes means for determining the integer ambiguity candidate by the LAMBDA method.

8. The attitude angle detecting apparatus according to claim 1, wherein said integer ambiguity redetermination means includes means for calculating floating ambiguities and an error covariance of the floating ambiguities.

9. The attitude angle detecting apparatus according to claim 1, wherein said integer ambiguity redetermination means includes means for determining the integer ambiguity candidate by the LAMBDA method.

10. An attitude angle detecting apparatus which receives radio waves from a plurality of position-fixing satellites by means of at least two antennas mounted on a mobile unit, one of the antennas being used as a reference antenna, determines the relative position of the antenna other than the reference antenna with respect to the reference antenna, and determines the heading and attitude of the mobile unit from said relative position of the antenna, said attitude angle detecting apparatus comprising:

means for observing a single phase difference or a double phase difference and determining an integer ambiguity from the single or double phase difference;

means for calculating said relative position from the phase difference of which integer ambiguity has been determined;

means for calculating attitude angles of the mobile unit and error covariance of the attitude angles and correcting the error covariance of the attitude angles; and integer ambiguity redetermination means for calculating at least one integer ambiguity candidate from the single phase difference for each of the position-fixing satellites or from the double phase difference for each pair of the position-fixing satellites based on the attitude angles and the corrected error covariance of the attitude angles and redetermining the integer ambiguity from the integer ambiguity candidate.

11. The attitude angle detecting apparatus according to claim 10 wherein said means for calculating the attitude angles of the mobile unit and the error covariance of the attitude angles includes an angular velocity sensor and means for calculating the attitude angles from an output of said angular velocity sensor.

12. The attitude angle detecting apparatus according to claim 10, wherein said means for calculating the attitude angles of the mobile unit and the error covariance of the attitude angles includes means for predicting the attitude angles and the error covariance of the attitude angles based on an assumed model depending on conditions of the mobile unit.

13. The attitude angle detecting apparatus according to claim 10, wherein said integer ambiguity redetermination means includes means for calculating floating ambiguities and an error covariance of the floating ambiguities.

14. The attitude angle detecting apparatus according to claim 10, wherein said integer ambiguity redetermination means includes means for determining the integer ambiguity candidate by the LAMBDA method.

15. The attitude angle detecting apparatus according to claim 1 or 10, wherein said attitude angle detecting apparatus uses both said means for determining the integer ambiguity from the attitude angles and the error covariance of the attitude angles and said means for determining the integer ambiguity from the single or double phase difference, or selectively uses one of these means, in redetermining the integer ambiguity.

16. The attitude angle detecting apparatus according to claim 15 wherein said means for calculating the attitude angles of the mobile unit and the error covariance of the attitude angles includes an angular velocity sensor and means for calculating the attitude angles from an output of said angular velocity sensor.

17. The attitude angle detecting apparatus according to claim 15, wherein said means for calculating the attitude angles of the mobile unit and the error covariance of the attitude angles includes means for predicting the attitude angles and the error covariance of the attitude angles based on an assumed model depending on conditions of the mobile unit.

18. The attitude angle detecting apparatus according to claim 15, wherein said integer ambiguity redetermination means includes means for calculating floating ambiguities and an error covariance of the floating ambiguities.

19. The attitude angle detecting apparatus according to claim 15, wherein said integer ambiguity redetermination means includes means for determining the integer ambiguity candidate by the LAMBDA method.

* * * * *